Dec. 20, 1955  S. C. NELSON  2,727,276
ADJUSTABLE EXTRUSION DEVICE
Filed Jan. 23, 1952  2 Sheets-Sheet 1
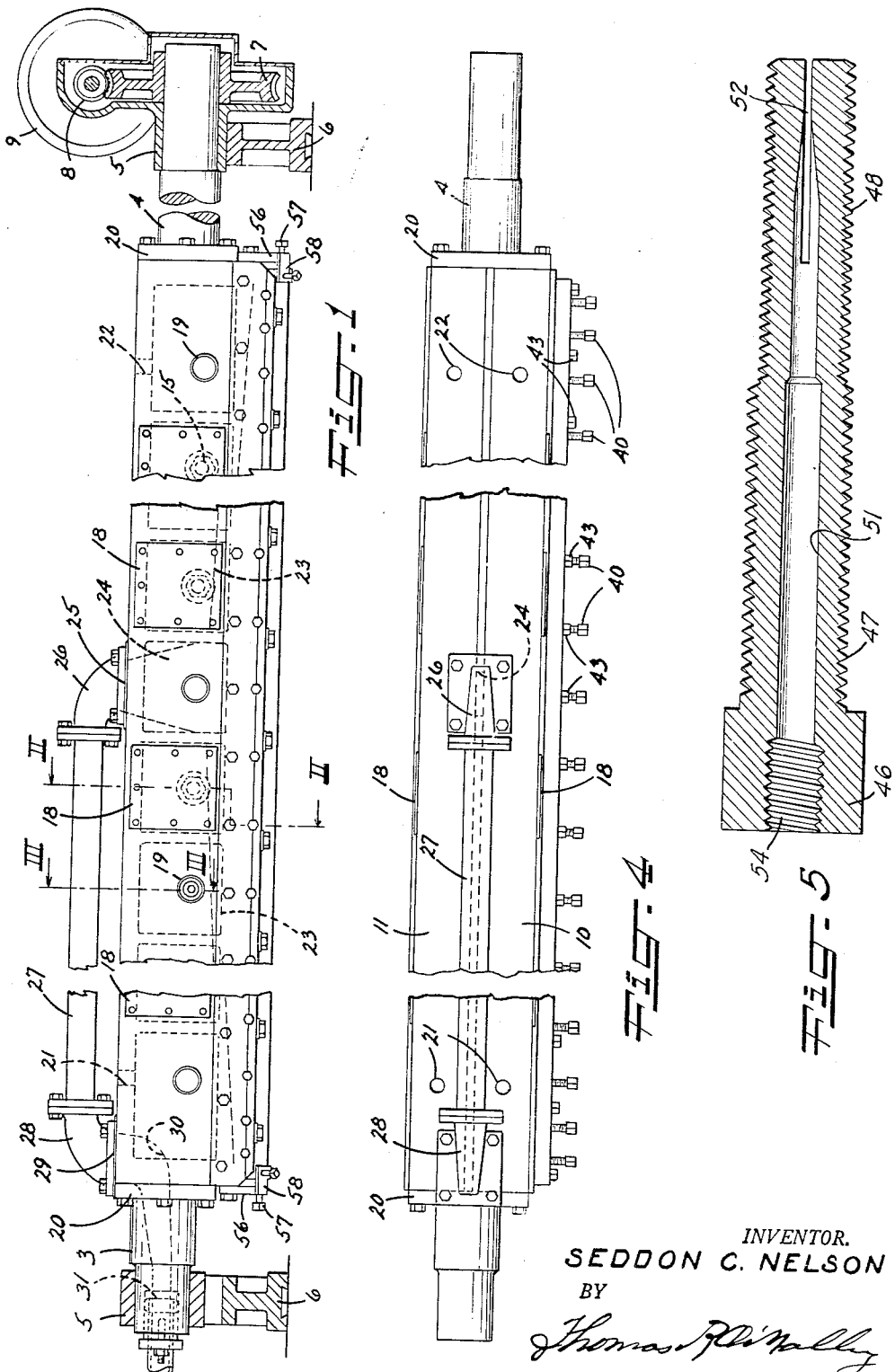
INVENTOR.
SEDDON C. NELSON
BY
Thomas R. M'Nally
ATTORNEY.

Dec. 20, 1955  S. C. NELSON  2,727,276
ADJUSTABLE EXTRUSION DEVICE
Filed Jan. 23, 1952  2 Sheets-Sheet 2
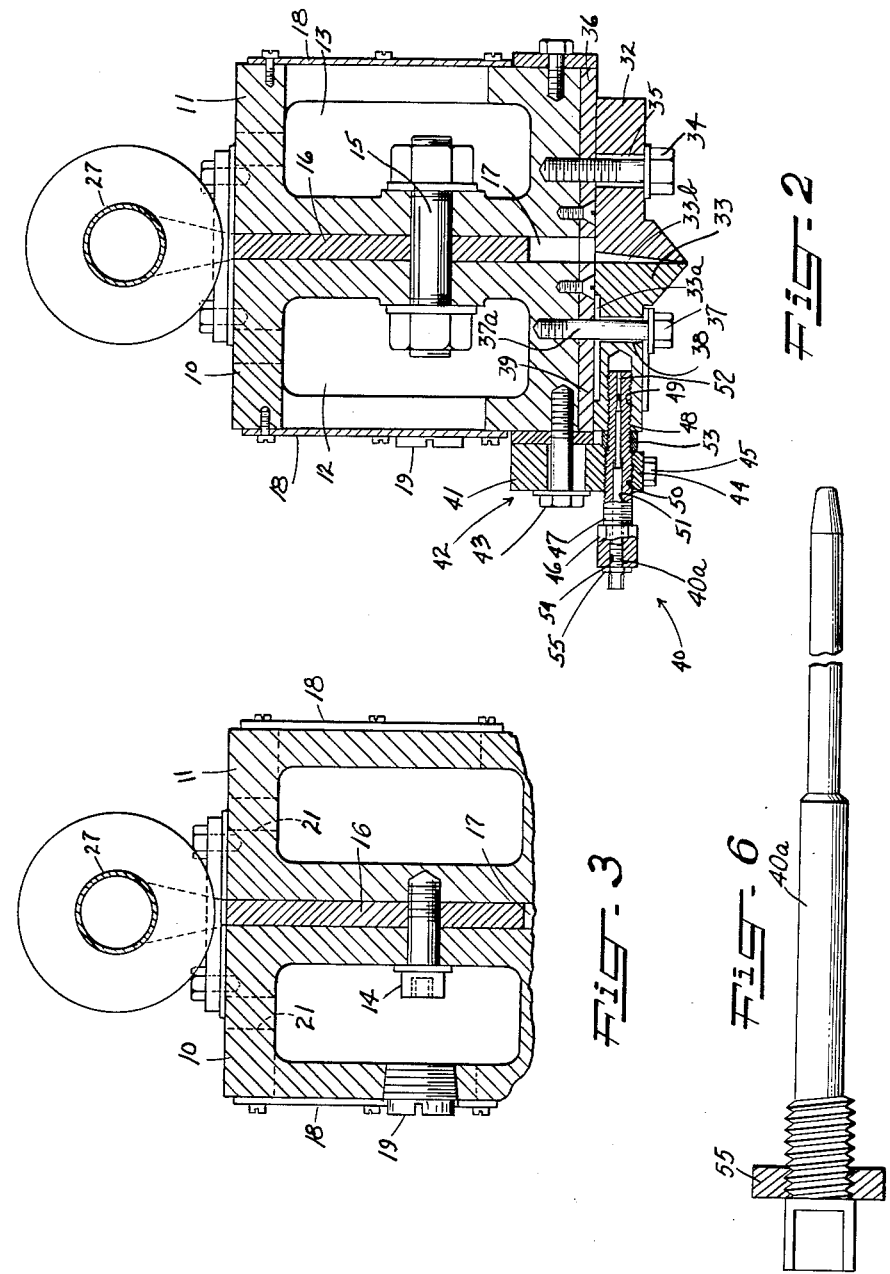
INVENTOR.
SEDDON C. NELSON
BY
Thomas B. O'Nally
ATTORNEY

United States Patent Office 2,727,276
Patented Dec. 20, 1955

2,727,276
ADJUSTABLE EXTRUSION DEVICE

Seddon C. Nelson, Fredericksburg, Va., assignor to American Viscose Corporation, Philadelphia, Pa., a corporation of Delaware Application January 23, 1952, Serial No. 267,866

7 Claims. (Cl. 18—15)

This invention relates to apparatus for the manufacture of non-fibrous foils, pellicles, films, sheets, and like products from film-forming compositions. More particularly it relates to improved means for conveniently and accurately controlling the ultimate thickness of the extruded film.

The manufacture of films, foils, and like products is commonly carried out by extruding a suitable substance such as viscose through an elongated orifice into a coagulating or regenerating bath. Ordinarily the orifice is formed by the space between two elongated metal plates called "lips" or "lip members" which are positioned at the bottom of the extrusion apparatus and which during the film-forming operation remain submerged in the coagulating or regenerating liquid. One or both of these lip members is ordinarily made adjustable for varying the width of the orifice and thereby regulating the thickness and uniformity of the extruded film. Adjustment of the lip members, however, is oftentimes very difficult from a technical standpoint due to the required minute tolerances in the ultimate width of the orifice and the extruded film. Although various previous improvements have been suggested to overcome this difficulty, they are not adapted to provide the precise control which is oftentimes necessary.

It is a principal object of this invention to provide novel and improved film extrusion apparatus wherein the dimensions of the elongated extrusion orifice may be conveniently and accurately adjusted.

It is a further object of this invention to provide an improved type of differential adjusting means for accurately controlling the width of an extrusion orifice.

It is a further object of this invention to provide an improved movable lip member upon which the detrimental effect of the pressure of the extruded spinning solution on the adjustability is reduced.

A still further object of the invention is to provide a threaded adjusting element for a film extrusion lip having little or no backlash.

Other objects and advantages of the invention will become apparent from the following description of the drawing wherein, Figure 1 is a front elevational view of a preferred embodiment of the invention;

Figure 2 is a section along reference line II—II in Figure 1;

Figure 3 is a section along reference line III—III in Figure 1;

Figure 4 is a plan view of the apparatus shown in Figures 1 and 2;

Figure 5 is an enlarged sectional view of the differential adjusting screw shown in Figure 2; and Figure 6 is an enlarged view of the expanding pin for the adjusting screw as shown in Figure 5.

Referring now more particularly to the drawing, the trunnions 3 and 4 of the spinning head assembly or film-forming material receptacle are rotatably mounted in the journal bearings 5 which are adapted to be positioned by means of the I-beam guide members 6 on opposite edges of a coagulating vessel or container not shown on the drawing. The worm gear 7 is affixed to the end of trunnion 4 and meshes with worm 8 which may be readily rotated by the associated hand wheel 9. Thus, it is seen that a convenient hand wheel means is provided to angularly adjust the position of the spinning assembly in the coagulating vessel and to invert the assembly for the inspection and maintenance thereof.

The spinning head assembly comprises a pair of elongated main castings 10 and 11 which are cored to provide the chambers 12 and 13 through which may flow a spinning solution temperature regulating medium such as water, steam or air. The elongated castings 10 and 11 are placed side by side and secured one to the other by the cap screws 14 and studs 15. Elongated spacer shims 16 which are located between the upper portion of the castings 10 and 11 separate the lower portion thereof and thereby provide the elongated opening 17 for the accommodation of a spinning solution as will be hereinafter more fully described.

The outside walls of the elongated castings are appropriately apertured opposite each of the cap screws 14 and studs 15 to provide greater accessibility thereto when it is desired to disassemble the spinning head. Front and back cover plates 18 and plugs 19 are respectively employed to seal the apertures for studs and the cap screws. End plates 20 extend across the open ends of the cored castings and enclose the chambers 12 and 13 which as stated hereinbefore may be employed to conduct a suitable temperature regulating medium between chamber inlet and discharge means 21 and 22.

The lower edges of each of spacer shims 16 are tapered upwardly from the ends of the elongated main castings toward the vertical passage 24 which passes between the shims through the upper surface of the spinning assembly. Boss 25 surrounds the upper surface of passage 24 and receives the elbow member 26 which is bolted thereto. The flanged pipe section 27 connects this elbow member 26 with a second elbow member 28 which is secured to the boss 29. Boss 29 is located on the top surface of the spinning assembly adjacent one end thereof and surrounds a passage 30 between the main castings formed by a notch in the associated spacer shim. Passage 30 extends downwardly and outwardly through an aperture in the end plate 20 and communicates with the hollowed trunnion 3, the stuffing box 31 and a spinning solution supply means not shown on the drawing. Thus, it is seen that a supply of spinning solution may be delivered from a source to a central portion of the spinning head assembly and then downwardly through an elongated opening therein.

Carried on the underside of the main castings 10 and 11 are the adjustable lip members 32 and 33 which determine the ultimate width of the extrusion orifice. Lip member 32 is fastened to the lower surface of main casting 11 by a plurality of cap screws 34 which extend upwardly through a plurality of slots 35 in the lip member, through the bearing plate 36 and threadedly engage the underside of the casting. The slots 36 permit a lateral sliding movement of the lip member on the cap screws and therefore a preliminary relatively coarse sliding adjustment of the width of the extrusion orifice.

Lip member 33 is likewise fastened to the lower surface of its respective casting 10 by a plurality of cap screws 37 which extend upwardly through a plurality of slots 38 in the lip member, through the bearing plate 39 and threadedly engage the underside of the casting. Thus, lip member 33 is similarly slidably adjustable on its respective cap screws 37 and may be accurately controlled by means of the adjusting screw 40 which will hereinafter be more fully described.

The orifice-defining surfaces of the opposed lip members 32 and 33 have been specially designed in the present invention to facilitate the sliding movement and the degree of adjustability of the slidable lip member 33 along its bearing plate 39 and the cap screws 37. Heretofore it has been customary to taper the spinning solution contacting surface of each lip member downwardly and inwardly from the bottom of the main casting and the associated bearing plate toward the extrusion orifice. However, since the spinning solution is ordinarily extruded under pressure, it has been found that the vertical pressure component of the downwardly flowing spinning solution against the tapered lip member causes a turning tendency thereof about the guiding cap screws which causes it to bind against the bearing plate and impede a sliding adjustment. Therefore in the present invention the entire spinning solution contacting surface of lip member 33 extends downwardly in a vertical manner from the bottom of the main casting 10 to the extrusion orifice. In this way no vertical pressure component of the downwardly flowing spinning solution is exerted on the lip member and a sliding adjustment thereof along the plane 33a extending at right angles to the face 33b may be more easily effected. It is to be noted that the cap screws 37 are preferably located on or adjacent the center of gravity of the lip member to further minimize any binding tendency thereof. It is to be also noted that the cap screws 37 engage threads which are set deep in the casting 10 such that the shanks 37a thereof may be flexed slightly to permit final minute adjustments of the lip member without the presence of sliding friction between the lip member and the head of each of the cap screws.

If desired, the opposed orifice-defining surface of lip member 32 may be tapered downwardly toward the extrusion orifice as is customary in the art. When the lip member 32 is constructed in this manner, its position may be preliminarily adjusted before the spinning operation is begun and then bolted tight to prevent any further sliding tendency. The final and accurate adjustments upon the dimensions of the extrusion orifice may then be effected during the spinning operation by means of adjusting screw 40 which is more fully described hereinafter.

While any convenient lip member adjusting means may be employed in the present invention, a particularly advantageous differential adjusting means is herein disclosed and claimed. The upper portion 41 of adjustment bar 42 is secured by the cap screws 43 to the side of the elongated main casting 10 and extends downwardly therefrom. The lower portion 44 of the adjustment bar is secured to the bottom surface of the upper portion 41 by the cap screws 45. Each of the differential adjusting screws 40 comprises a head portion 46, an enlarged threaded portion 47 and a reduced diameter threaded portion 48. The reduced diameter threaded portion of each adjusting screw engages the complementary threaded aperture 49 in the lip member 33. The enlarged threaded portion 47 of each of the adjusting screws extends through the complementary threaded apertures 50 between the abutting upper and lower portions 41 and 44 of the adjustment bar. The split nature of the threaded apertures 50 permits an initial orientation of the adjusting screw in the lip member so that it can be conveniently assembled together. It is to be also pointed out that the split ntaure of the apertures 50 is adapted to permit a tight fit on the enlarged portion 47 of the associated adjusting screw so as to reduce any backlash therein.

A greater number of threads per unit length are cut in the reduced diameter threaded portions 48 and their complementary lip member aperture 49 than in the enlarged threaded portions 47 and their complementary adjustment bar apertures 50 so that as the differential screw 40 is rotated the lip member slides an amount which is directly dependent upon the difference in the pitch of the threads on the two threaded portions. Thus, if 8 threads per inch are cut in the enlarged portion and 9 threads per inch are cut in the reduced portion, the lip member moves only ⅛″−⅑″=.014 inch for each revolution of the screw.

It is to be understood that, although the diameter of the threaded portion of the differential screw which engages the adjustment bar has been described as being larger than the diameter of the threaded portion of the differential screw which engages the lip member, the relative magnitude of the diameters thereof could be reversed without departing from the spirit or scope of the present invention.

Each of the differential screws 40 has an elongated aperture 51 therein which extends from the head portion extremity inwardly along the axis thereof. Each of the apertures tapers to a point adjacent the opposite extremity of the associated differential screw. Slot 52 which extends inwardly from the outer end of the reduced diameter portion beyond the top of the tapered aperture 51 divides each adjusting screw into a pair of split end sections. An elongated expanding pin 40a is inserted in each of the apertures 51 to spread the end sections of the associated adjusting screw. In this way the adjusting screw may be adapted to tightly engage the threads of the associated lip member aperture 49 and thereby reduce to an absolute minimum backlash therebetween. The proper adjustment of the expanding pin in the bore of the differential screw 40 enables the operator to vary the class fit between the threads of the screw and those on the lip. It is, therefore, possible to obtain an extremely accurate and precise adjustment of the lip because there can be no uncontrolled movement of the lip unless the adjusting screw is turned due to the absence of backlash. Rubber washers 53 are preferably inserted on the differential screws between the stationary adjustment bar and the movable lip to protect the screw against undue corrosion.

Each aperture 51 in the differential screws adjacent its head portion is preferably threaded as at 54 to accommodate a complementary threaded portion of the tapered pin 40a. In this way the fit between the split sections of the screw and lip member aperture may be adjusted and locked by means of lock nut 55. It is to be pointed out, however, that once the fit has been properly made no further adjustment of the lock nut is required during a given spinning operation.

End block adjusting plates 56 are bolted to each end of the elongated castings and extend downwardly therefrom. Each of the adjusting plates carries bolt means 57 for removably clamping the end blocks 58 across the open ends of the elongated orifice.

While a preferred embodiment of the invention has been disclosed, the description is intended to be illustrative only and it is to be understood that changes and variations may be made without departing from the spirit and scope of the invention as defined by the appended claims.

I claim:

1. Film extrusion apparatus comprising a receptacle having an elongated opening which extends through a planar exterior surface thereof; a pair of lip members; means for slidably mounting the lip members on said planar surface of the receptacle on opposite sides of the elongated opening, the orifice defining surface of one of the lip members being disposed in parallelism with the normal flow of a film-forming material through the elongated opening of the receptacle; a lug-like protrusion which is connected to the receptacle and which extends outwardly beyond said planar exterior surface thereof; an adjusting screw having an enlarged diameter threaded portion and an axially aligned reduced diameter differently pitched threaded portion, the enlarged portion engaging a complementary threaded portion in the lug-like protrusions when the reduced portion engages a complementary threaded aperture in one of the lip members, the adjusting screw also having an elongated tapered bore which extends inwardly along the axis thereof from the enlarged diameter extremity of the element toward its reduced diameter extremity which is slotted to form at least a pair of split end sections; and an elongated expanding pin retained in the bore of the screw to radially adjust the split end sections thereof.

2. Film extrusion apparatus comprising a receptacle having an elongated opening which extends through a planar exterior surface thereof; a pair of lip members secured to said receptacle; means for slidably mounting at least one of the lip members on said planar surface of the receptacle on opposite sides of the elongated opening, the orifice defining surface of one of the lip members being disposed in parallelism with the normal flow of a film-forming material through the elongated opening of the receptacle, a fixed threaded element attached to said receptacle, a differential adjusting screw mounted in said fixed element and threaded in the adjustable lip member, said screw having an elongated tapered bore which extends inwardly along the axis thereof from the enlarged diameter extremity of the screw toward its reduced diameter extremity which is slotted to form at least a pair of split end sections; and an elongated expanding pin retained in the bore of the screw to radially adjust the split end sections thereof.

3. Apparatus in accordance with claim 1 having means for adjusting the expanding pin in the bore of the screw.

4. Apparatus in accordance with claim 2 having means for axially adjusting and locking the expanding pin in the differential screw.

5. Anti-backlash adjustment for film extrusion apparatus comprising an adjustable lip defining one side of a film extrusion orifice, a differential adjusting screw threaded into said lip, a stationary support for said adjusting screw into which the adjusting screw is also threaded, and adjusting means for controlling the threaded engagement between the screw and the lip to substantially eliminate backlash therebetween.

6. Apparatus in accordance with claim 5 in which the last-named means comprises an expanding pin adjustably threaded in the bore of the differential screw.

7. Apparatus in accordance with claim 6 having means for locking the expanding pin in a predetermined adjusted position in the differential screw.

References Cited in the file of this patent

UNITED STATES PATENTS

| | | |
|---|---|---|
| 1,677,607 | Wood | July 17, 1928 |
| 1,920,118 | Walsh et al. | July 25, 1933 |
| 1,924,010 | Wickham | Aug. 22, 1933 |
| 2,019,119 | Crane et al. | Oct. 29, 1935 |
| 2,292,557 | Wilson | Aug. 11, 1942 |
| 2,300,211 | Eberlin | Oct. 27, 1942 |
| 2,304,886 | Conklin et al. | Dec. 15, 1942 |
| 2,364,435 | Foster et al. | Dec. 5, 1944 |
| 2,379,831 | Scherer | July 3, 1945 |